US012686608B2

(12) United States Patent
Benayas Pérez et al.

(10) Patent No.: US 12,686,608 B2
(45) Date of Patent: Jul. 21, 2026

(54) PORTABLE REFRIGERATED DESKTOP DISPENSER FOR BEVERAGES

(71) Applicants: Luis Benayas Pérez, Madrid (ES); Javier Pérez Pérez, Madrid (ES)

(72) Inventors: Luis Benayas Pérez, Madrid (ES); Javier Pérez Pérez, Madrid (ES)

( * ) Notice: Subject to any disclaimer, the term of this patent is extended or adjusted under 35 U.S.C. 154(b) by 270 days.

(21) Appl. No.: 18/579,744

(22) PCT Filed: Jun. 3, 2022

(86) PCT No.: PCT/ES2022/070347
§ 371 (c)(1),
(2) Date: Jan. 16, 2024

(87) PCT Pub. No.: WO2023/285712
PCT Pub. Date: Jan. 19, 2023

(65) Prior Publication Data
US 2024/0317568 A1 Sep. 26, 2024

(30) Foreign Application Priority Data
Jul. 16, 2021 (WO) ................. PCT/ES2021/070459

(51) Int. Cl.
*B67D 3/00* (2006.01)
*B67D 3/04* (2006.01)

(52) U.S. Cl.
CPC ......... *B67D 3/0009* (2013.01); *B67D 3/0035* (2013.01); *B67D 3/0038* (2013.01); *B67D 3/0083* (2013.01); *B67D 3/041* (2013.01); *B67D 2210/0006* (2013.01)

(58) Field of Classification Search
CPC .. B67D 3/0009; B67D 3/0038; B67D 3/0083; B67D 3/041; B67D 2210/0006
See application file for complete search history.

(56) References Cited

U.S. PATENT DOCUMENTS 996,127 A * 6/1911 Patnaude ............. B67D 3/0009
62/331
2,289,645 A * 7/1942 Geisert ...................... F25D 5/00
251/300
3,933,275 A * 1/1976 Metzner ................ F25D 31/007
211/74
4,932,561 A * 6/1990 Boxall ................. B67D 1/0858
222/638
(Continued)

FOREIGN PATENT DOCUMENTS

ES 2354783 B1 10/2011
WO 2006013715 A1 2/2006
WO WO-2006063773 A1 * 6/2006 ........... B67D 3/0012

*Primary Examiner* — Bob Zadeh
(74) *Attorney, Agent, or Firm* — Hayes Soloway PC

(57) ABSTRACT

A portable desktop refrigerated dispenser for beverages, preferably bottled, includes a base, a cup intended for housing beverages, a holder lid equipped with holder lid holes, bottle holders that can be coupled to the holder lid holes that retain the bottles inverted and inclined, a cool box that limits a cooling cavity around the cup and that is intended for housing a cooling element, a manifold connected to the cup that receives the beverage and at least one tap assembly connected to the manifold through which the beverage is dispensed. Alternatively, the cup can be filled from a dispensing column for draught beverages, dispensing with the bottle holders.

23 Claims, 12 Drawing Sheets

(56) References Cited

U.S. PATENT DOCUMENTS

| | | | | |
|---|---|---|---|---|
| 5,890,629 | A * | 4/1999 | Loew | B67D 3/0035 222/144.5 |
| 2005/0103804 | A1 | 5/2005 | Waters | |
| 2010/0083686 | A1* | 4/2010 | Reels | F25D 23/12 62/390 |
| 2011/0006078 | A1 | 1/2011 | Hsu | |
| 2012/0067921 | A1* | 3/2012 | Shippen | B67D 3/0083 222/144 |
| 2014/0102570 | A1 | 4/2014 | Schaefer et al. | |
| 2019/0127203 | A1 | 5/2019 | Bhutani et al. | |

* cited by examiner

B-B

PORTABLE REFRIGERATED DESKTOP DISPENSER FOR BEVERAGES

CROSS-REFERENCE TO RELATED APPLICATIONS AND PRIORITY

This patent application claims priority from PCT Application No. PCT/ES2022/070347 filed Jun. 3, 2022, which claims priority from PCT Application No. PCT/ES2021/070459 filed Jul. 16, 2021.

OBJECT OF THE INVENTION

The present invention relates to a portable desktop refrigerated dispenser for beverages that is equipped with a cup that collects the beverage from several bottles that are held above the cup by means of holders, an outer casing that acts as a cool box, a holder lid for holding said bottles and at least one tap assembly through which the beverage is dispensed.

Due to the configuration of the dispenser, the beverage from several bottles can be shared, dispensing the beverage from a single device and keeping it cold. Moreover, the holders adapt to bottles of any type and keep them in an upright position wherein the brand of the bottles is visible. Additionally, the dispenser can be easily disassembled allowing for the components to be washed regularly.

BACKGROUND OF THE INVENTION

Beverage dispensers for collective use are known in the state of the art, as is the case of the dispenser disclosed in patent document ES2354783, which relates to a beverage dispenser with a beverage receptacle, with emptying holes in the base thereof, stopped with valves, a support base supporting the receptacle, pouring mechanisms to open the valves and a cooling element assembled between the receptacle and the support base.

As for document US2012/0067921, it also claims a dispenser comprising an ice storage receptacle that is in contact with beverage receptacles and cup storage receptacles. The storage receptacles, as well as the structure for holding the beverage receptacles, are held by a base. The invention additionally envisages bottle holders, attached to the structure to accommodate the bottles and individually dispense the beverage from each bottle.

However, this type of device does not allow beer to be collectively collected from several beer bottles at the same time, keeping the beer cold. Additionally, the cleaning of the tap system is complex and cannot be easily disassembled.

DESCRIPTION OF THE INVENTION

The present invention relates to a portable desktop refrigerated dispenser for beverages which, as described in claim 1, comprises a base intended for resting on a support surface, a cup intended for housing the beverage equipped with an outlet mouth through which the beverage is ejected, a holder lid that can be linked to the cup at a height with respect to the outlet mouth and that is equipped with lid holes, bottle holders that can be coupled to the holder lid holes that are in turn equipped with bottle holder cavities intended for retaining the neck of the bottles and retain them inverted and inclined, a cool box that is an outer casing that can be linked to the cup by means of a watertight attachment and that surrounds it at a certain distance, limiting a cooling cavity around the cup intended for housing a cooling element and wherein the cool box is equipped with a central cavity that is coaxial to the outlet mouth of the cup, a tap connection part attached to an upper area of the base and which is equipped with a housing, a manifold housed in the housing and connected to the outlet mouth of the cup, which is intended for receiving the beverage and is equipped with at least one outlet hole through which the beverage is ejected and at least one tap assembly removably linked to the tap connection part equipped with a tube equipped with an inner end connected to the outlet hole and an outer end through which the beverage is dispensed.

There are two filling options:

On the one hand, the holder lid, being able to be linked to the cup, can be detachable, enabling the beverage to be directly emptied from another receptacle other than bottles, for example, directly from a barrel, a beverage tank or bottles of any type of beverage in general, into the cup and serve them in the dispenser object of the invention.

On the other hand, the bottles empty their content onto the cup when they are inserted through the bottle holders, the bottles remaining supported therein. The bottles are placed in that position exhibiting their brand during the use of the dispenser when they are retained in an inverted and inclined manner in the bottle holder cavities, enabling a group of people, located around it, to fill their own cups in an individual and fun way. Alternatively, due to the fact that the holder lid can be easily detached from the cup, the cup can be used to be directly filled from a dispensing column with, for example, draught beer, in the event that the beverage to be dispensed is beer.

The bottles can be left in place while the dispenser is in use and the bottle holders are specially designed to be able to receive, hold and maintain any type of bottle on the market, regardless of the shape or capacity thereof.

Moreover, the elements and components of the dispenser are completely removable and accessible, which facilitates the cleaning thereof, especially with regard to the components of the tap assembly. It is worth noting that all the parts in contact with the beverage comply with the regulations for plastics in contact with food, wherein the tube can preferably be a silicone tube.

The tap assemblies can preferably be two and be facing each other so as to enable simultaneous self-service by two users. Both the cup and the cool box can be made of a transparent or semi-transparent material that allows the content to be viewed. The content of the cup is cooled due to the cooling cavity, wherein the cooling elements can be ice and/or water, avoiding the use of electricity for cooling.

The holder lid holes can describe a narrowing and the bottle holders may comprise an attachment tab that is clipped to said narrowing to achieve a robust and removable attachment. The holders are designed to place the bottles and pour the content thereof into the cup, being able to hold any type of bottle on the market, regardless of the shape or capacity thereof.

The holder lid can be in the shape of a cup, having a circular base surface equipped with the holder lid holes in which the supports are hooked and said base surface being limited by a lower holder lid edge, from which a lateral surface extends. This configuration provides robustness to the holder lid while facilitating the linking with the cup. As for the cup, it may comprise an upper cup edge equipped with first attachment elements and the holder lid may comprise second attachment elements on the lower holder lid edge that can be linked to the first attachment elements, wherein this attachment is fundamental to provide stability and prevent the holder lid from possibly tipping over due to the weight of the bottles placed on the bottle holders during the use of the dispenser.

Additionally, the dispenser may comprise a lighting system with LED lights, wherein the LED lights can be fixed to the internal portion of the tap connection part by means of an anchoring system that enables it to be easily assembled and disassembled. The lighting system is charged via USB cable. The light rises through the cool box and the cup, illuminating these two components, as well as the water and ice contained in the cool box and the beverage contained in the dispenser cup. The drive can be manual or by means of remote control.

According to a preferred application of the invention, the beverage is beer and the beverage bottles are beer bottles. In any case, the dispenser is applicable for all types of beverages, whether alcoholic or not, for use thereof with different beverages that are combined inside the cup and for all types of bottles or other types of containers or receptacles.

DESCRIPTION OF THE DRAWINGS

As a complement to the description provided herein, and for the purpose of helping to make the features of the invention more readily understandable, in accordance with a preferred practical exemplary embodiment thereof, said description is accompanied by a set of drawings constituting an integral part of the same, which by way of illustration and not limitation, the following has been represented.

PREFERRED EMBODIMENT OF THE INVENTION

Figure 1:
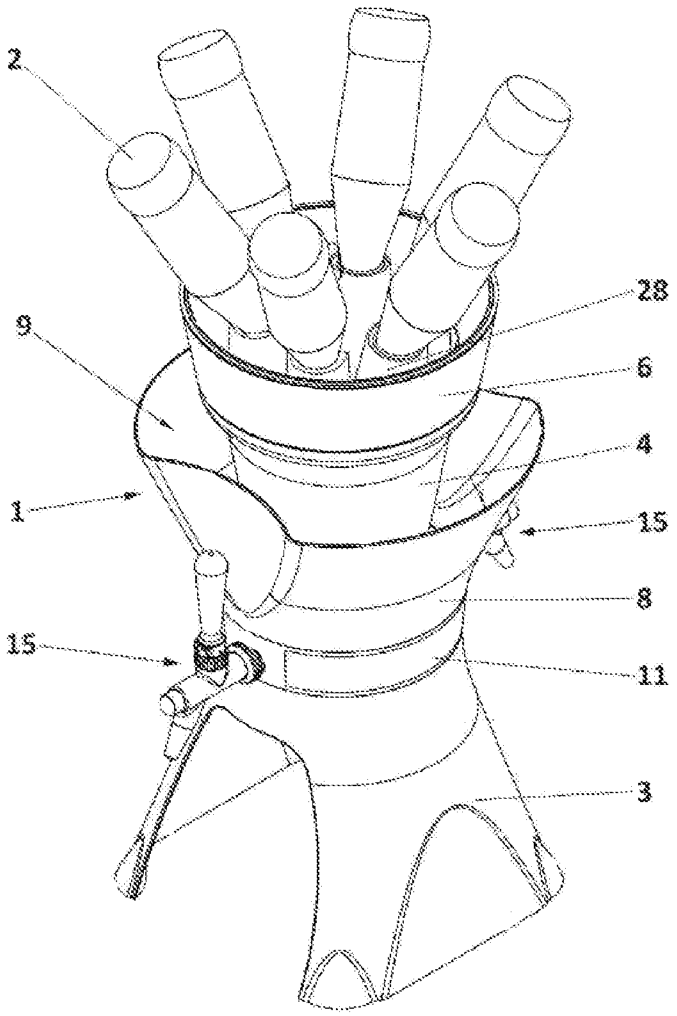
FIG. 1 shows a perspective view of the dispenser.

FIG. 1 shows a perspective view of a portable desktop refrigerated dispenser (1) for beverage bottles, such as beer bottles (2), in a final assembly situation, wherein the dispenser (1) comprises a base (3) intended for resting on a support surface the function of which is to hold and give stability to the remaining portions of the dispenser (1). The device (1) comprises a cup (4) intended for housing beer, equipped with an outlet mouth (5) through which beer is ejected and a holder lid (6) that is linked to the cup (4) that is at a height with respect to the outlet mouth (5). The holder lid (6) has holder lid holes (7) wherein bottle holders (28) are coupled, which are in turn equipped with bottle holder cavities (29) that embrace the neck of the bottles (2) and retain the bottles inverted and inclined as shown in the image, making the brand of the bottle (2) visible.

The dispenser (1) has a cool box (8) which is an outer casing linked to the cup (4) by means of a watertight attachment and which surrounds it at a certain distance, limiting a cooling cavity (9) around the cup (4) intended for housing a cooling element. Between the base (3) and the cool box (8) there is the tap connection part (11) attached to an upper area of the base (3), to which two taps (15) are linked through which the beer is dispensed.

Figure 2:
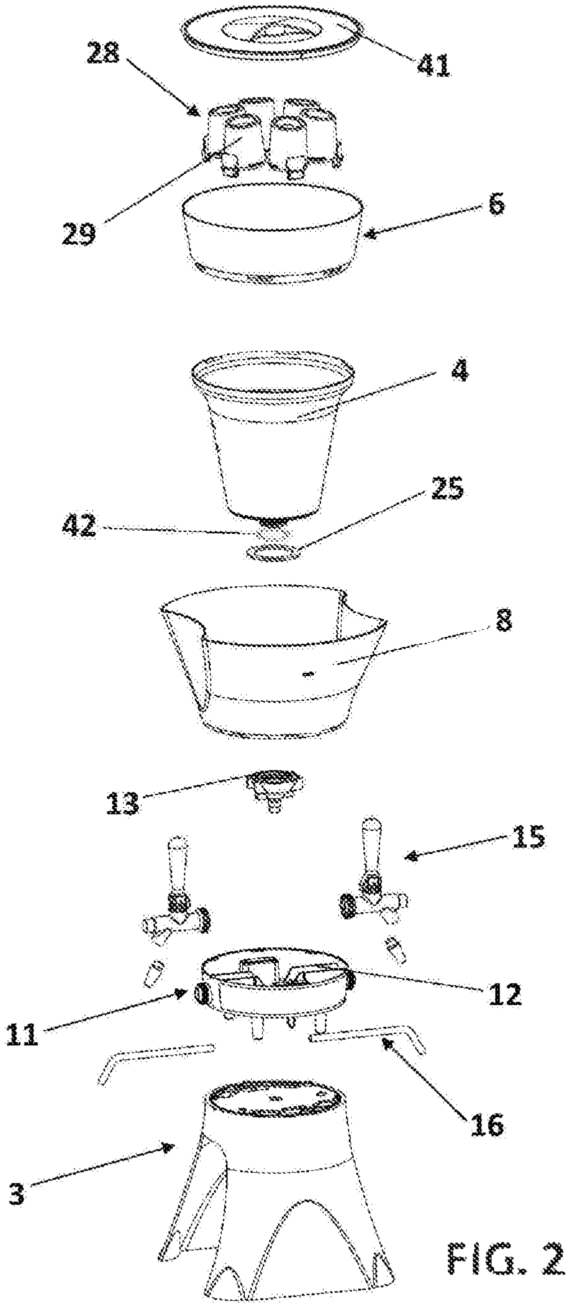
FIG. 2 shows a first exploded view of a portion of the dispenser.

FIG. 2 shows a first exploded view of a portion of the dispenser (1), according to the present invention. The base (3), the tap connection part (11) on the same, equipped with the housing (12) wherein the manifold (13) is housed, LED lights on the inner portion of the tap connection part (11), a closure gasket (42), the cool box (8), a sealing gasket (25), the cup (4), the holder lid (6) with the holder lid holes (7) thereof, the bottle holders (28) with the bottle holder cavities (29) thereof and an upper lid (41) covering the holder lid (6) can be seen. The cool box (8) is equipped with a central cavity (10) configured to be arranged coaxially to the outlet mouth (5) of the cup (4).

The tap connection part (11) is equipped with a housing (12), wherein a manifold (13) is housed. The manifold (13) is configured to be connected to the outlet mouth (5) of the cup (4), so that it receives the beer coming from the cup (4) and distributes it to the taps (15). It can be seen that the base (3) has connection windows (62) to facilitate the connection of the tap connection part (11).

Figure 3:
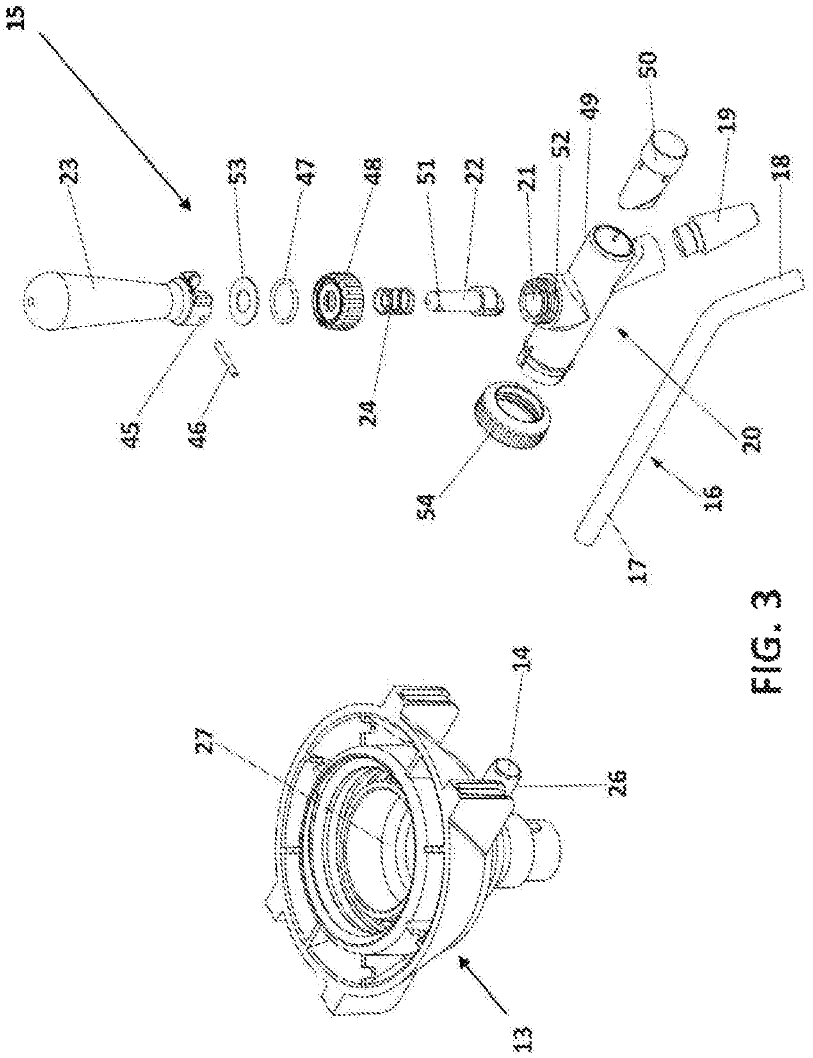
FIG. 3 shows a second exploded view of a portion of the dispenser.

FIG. 3 shows a second exploded view of a portion of the dispenser (1), specifically the tap assembly (15) and the manifold (13), according to the present invention. The tap assembly (15) is equipped with a tube (16) equipped with an inner end (17) configured to be connected to the manifold (13) and an outer end (18).

The tap assembly (15) comprises a tubular body (20) that partially houses the tube (16) and that is equipped with an access hole (21) that partially houses a plunger (22) and a handle (23) that is linked to the plunger (22), wherein in a vertical rest position the plunger (22) presses the tube (16) deforming it and preventing the liquid from coming out and in an activation position the movement of the handle (23) moves the plunger (22) away from the tube (16), enabling beer to pass therethrough.

Additionally, the tap assembly (15) comprises a nozzle (19) configured to be connected to the body (20) by pressure, wherein both the nozzle (19) and the tube (16) are made of plastic materials that comply with the regulations on plastic materials in contact with food.

Additionally, the tap assembly comprises a pin (46) housed in a handle hole (45) in the handle (23) and a pin hole (51) made in the plunger (22) that enables the handle (23) to rotate causing it to move the plunger (22) with its rotation, as explained later.

The access hole (21) is limited by an external threaded access surface (52) to which a spring support (48) is coupled and on which an O-ring (53) and a washer (47) are arranged. It additionally comprises a cap (50) and a nut (54) linked to the body (20) that enables the body (20) to be attached to a tap connection protrusion (57) of the tap connection part (11).

Likewise, the tap assembly (15) comprises a spring (24) that embraces the plunger (22) and forces the handle (23) to return to the vertical rest position when the handle (23) is in an intermediate activation position, between a fixed horizontal activation position and the vertical rest position.

The manifold (13) is equipped with two outlet holes (14) through which the beer is ejected towards the two tubes (16) connected to said outlet holes (14), wherein the outlet holes (14) are limited by two external connections (26) that are tubular protrusions and the dispenser (1) comprises two tap assemblies (15), wherein the tubes (16) of the tap assemblies (15) embrace the external connections (26) at the inner end (17) thereof.

The manifold (13) comprises a non-through cavity (27) equipped with a threaded inner surface, wherein the outlet mouth (5) of the cup (4) is housed, which is defined by a tubular protrusion with a threaded outer surface that is screwed with said internal threaded surface of the cavity (27).

Figure 5:
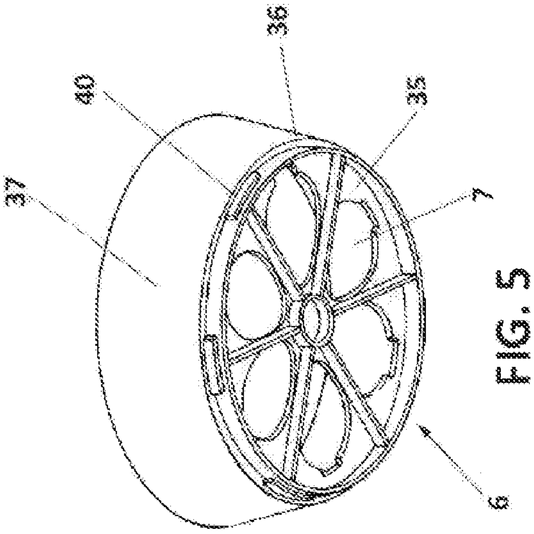
FIG. 5 shows a perspective view of the holder lid.
Figure 4:
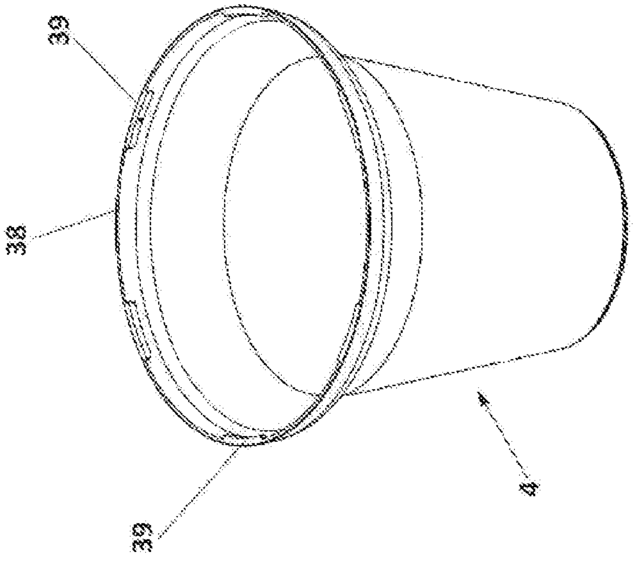
FIG. 4 shows a perspective view of the cup.

FIG. 4 shows a perspective view of the cup (4) and FIG. 5 shows a perspective view of the holder lid (6). The holder lid (6) comprises a circular base surface (35) equipped with the holder lid holes (7) and limited by a lower lid edge (36) from which a conical lateral surface (37) extends. The cup (4) comprises an upper cup edge (38) equipped with first attachment elements (39) and the holder lid (6) comprises second attachment elements (40) on the lower holder lid edge (36) that can be linked to the first attachment elements (39).

Specifically, the holder lid (6) has six external female areas in which the six internal male areas of the cup (4) are inserted, embedding the male and female areas of both parts, by means of a bayonet locking system, rotating the holder lid (6) until the end of the path.

Figure 7A:
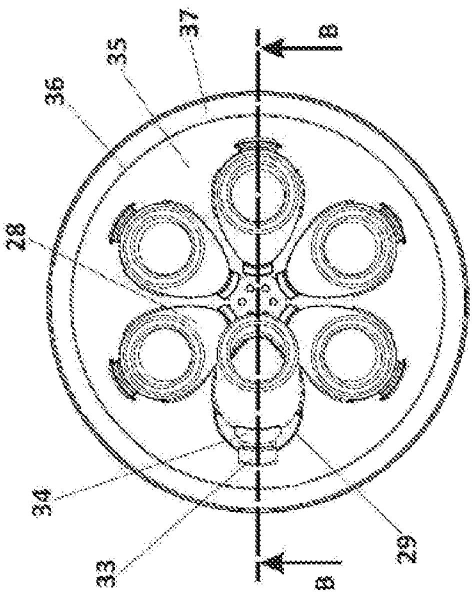
FIG. 7A shows a top view of the holder lid with the bottle holders.
Figure 7B:
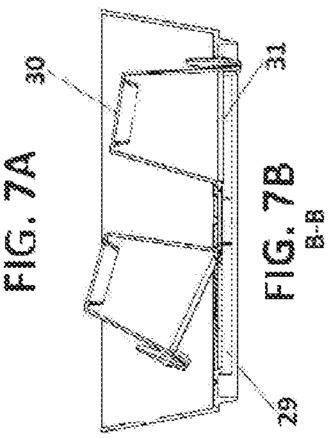
FIG. 7B shows a cross-sectional view according to a B-B cut of FIG. 7A.
Figure 6:
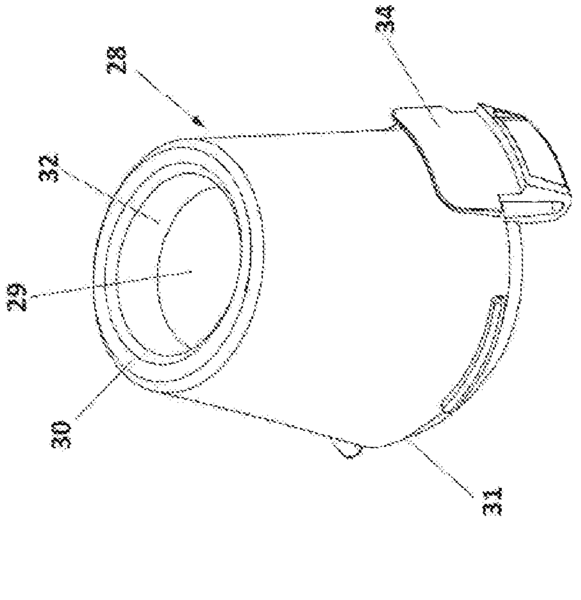
FIG. 6 shows a perspective view of a bottle holder.

FIG. 6 is a perspective view of a holder (28), according to the present invention, wherein the bottle holders (28) are conical tubular bodies limited by an upper bottle holder edge (30) and a lower bottle holder edge (31), wherein the upper bottle holder edge (30) is inclined with respect to the lower holder edge (31) as can be seen in FIG. 7B.

The bottle holders (28) comprise a curved surface (32) that extends from the upper holder edge (30) towards the inside of the holder (28), reducing the transversal section thereof. Additionally, it can be seen that the bottle holders (28) comprise an attachment tab (34).

FIG. 7A shows a top view of the holder lid (6) with the bottle holders (28), and FIG. 7B shows a transversal section of FIG. 7A according to a B-B cut. The holder lid holes (7) describe a narrowing (33) where the attachment tab (34) is clipped.

Figure 8A:
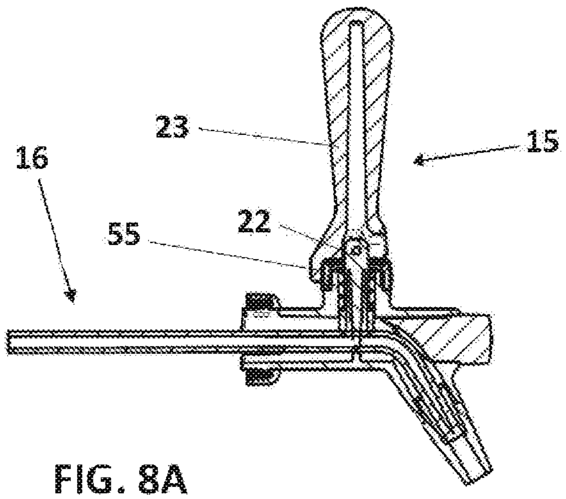
FIG. 8A shows a transversal view of the tap assembly in a vertical rest position.
Figure 8B:
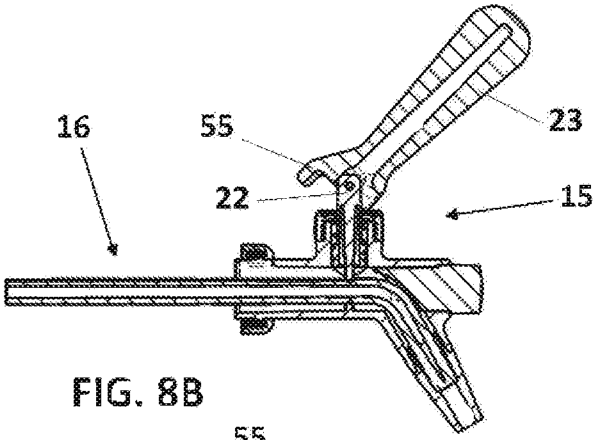
FIG. 8B shows a transversal view of the tap assembly in an intermediate activation position.
Figure 8C:
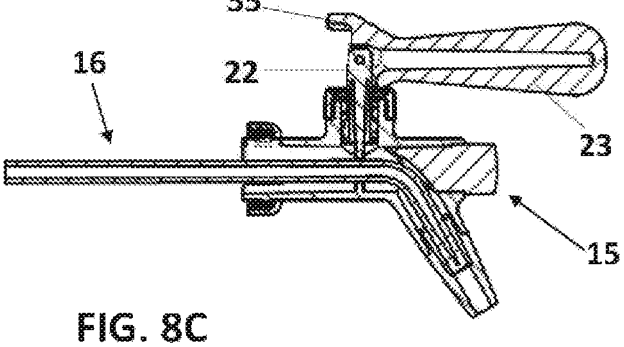
FIG. 8C shows a transversal view of the tap assembly in a fixed horizontal activation position.

FIGS. 8A, 8B and 8C show the tap assembly (15) with the handle (23) in a vertical rest position, in an intermediate activation position and in a fixed horizontal activation position, respectively. The handle (23) in the vertical rest position of FIG. 8A maintains the plunger (22) pressing the tube (16) deforming it and preventing the liquid from escaping. When the handle (23) is inclined forward, as in FIG. 8B, in an intermediate activation position, the opening of the tube (16) is allowed, enabling the passage of the liquid and once the force is no longer exerted, it recovers the initial position thereof. FIG. 8C shows the fixed horizontal activation position, which enables the opening of the tube (16) and the locking of the handle (23).

Thus, when the handle (23) is in the vertical rest position, the assembly formed by the handle (23), pin (46), washer (47), O-ring (53), spring holder (48), spring (24) and plunger (22) maintain the tube (16) pressed, partially located inside the body (20), preventing the passage of the beverage. When the handle (23) is pulled forward, but without reaching the fixed horizontal position, the tube (16) recovers the normal position thereof, when the plunger (22) rises, enabling the passage of the beverage until the handle (23) recovers the vertical rest position thereof.

In the same way, the tap assembly (15) comprises a stop extension (55) that starts from a rear area of the handle (23) and that prevents the handle (23) from colliding with the cool box (8), maintaining the vertical position of said handle (23) as limit position, the maximum movement range of the handle being from the vertical position shown in FIG. 8A to the horizontal position shown in FIG. 8C.

Figure 9:
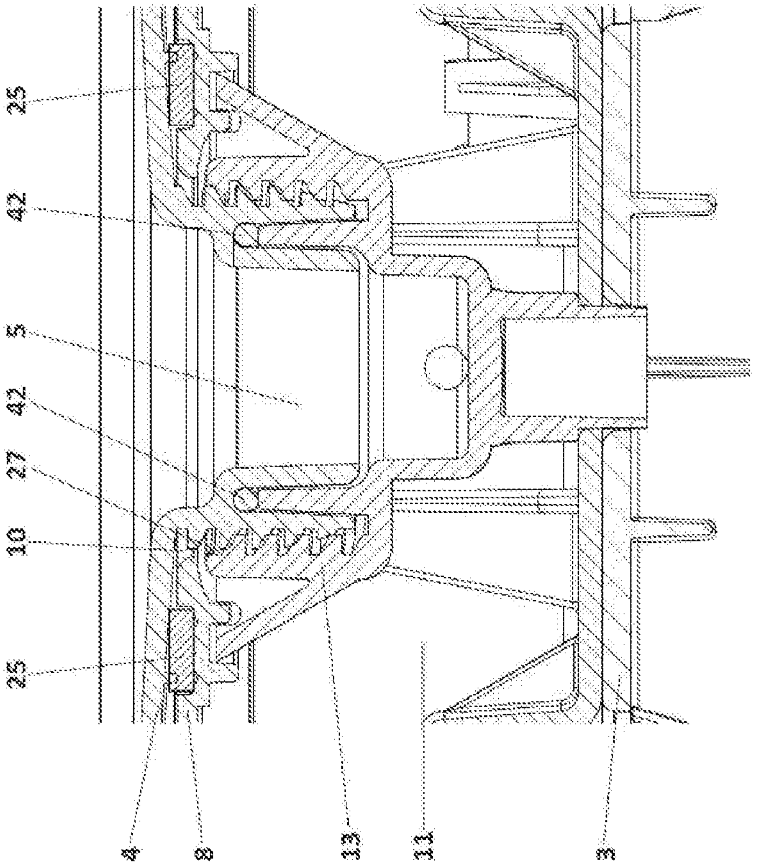
FIG. 9 shows a cross-sectional view of a detail of the dispenser.

FIG. 9 shows a cross-sectional view of a detail of the dispenser (1), according to the present invention, wherein the manifold (13) comprises the non-through cavity (27) limited by an internal threaded surface wherein the threaded outer surface of the outlet mouth (5) of the cup (4) is screwed.

The sealing gasket (25) arranged between the cup (4) and the cool box (8) and around the central cavity (10) of the cool box (8) that prevents leaks of the liquid housed in the cooling cavity (9) can be seen. Likewise, the closure gasket (42) between the manifold (13) and the cup (4) can be seen, which prevents leaks in the aforementioned threaded attachment that attaches both parts. The sealing gasket (25) is compressed while the cup (4) is screwed onto the manifold (13).

Figure 10:
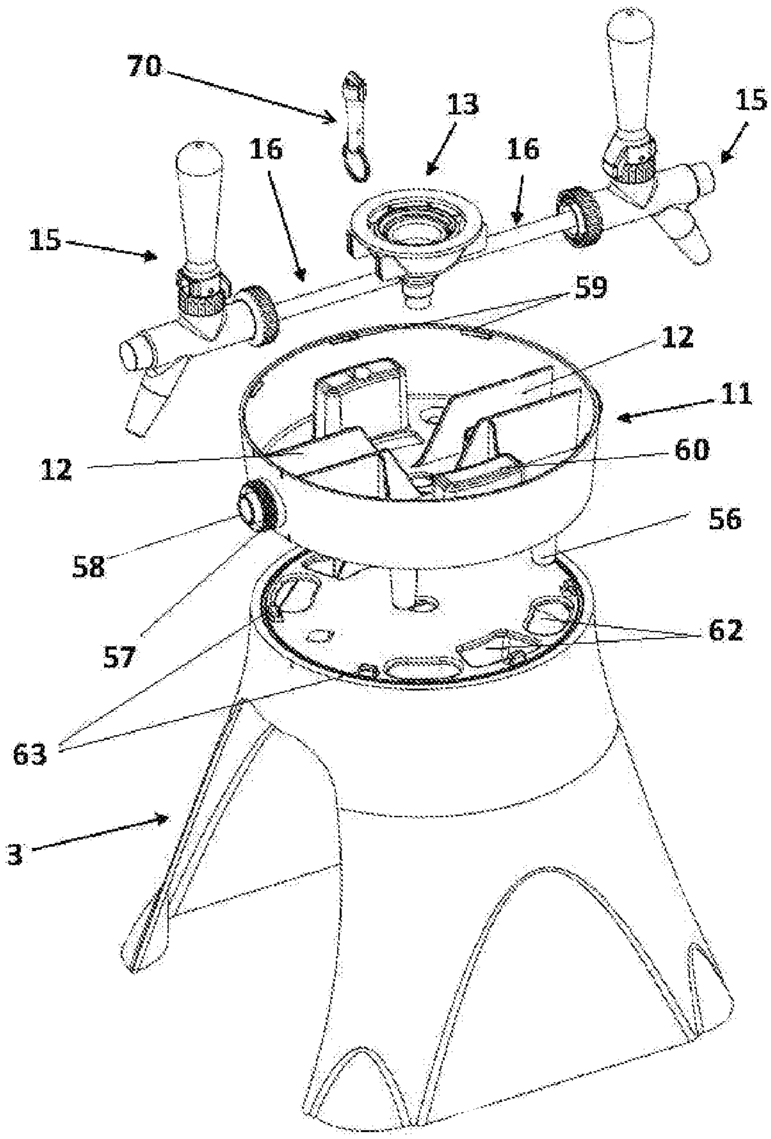
FIG. 10 shows a top perspective view of the base and the tap connection part.

FIG. 10 shows a perspective view of the tap connection part (11), the tube (16) and the manifold (13), according to the present invention. In the lower portion of the tap connection part (11) there are four round legs (56) that make it possible for the dispenser (1) to rest on any surface without the base (3), with all the rest of the assembled components thereof, facilitating its handling and making it easier to fill the cup (4) when it is carried out from a beer dispensing column. The four legs (56) are inserted into the connection windows (62) of the base (3) when both parts are attached.

On both sides, the tap connection part (11) has two tap connection protuberances (57) with an external threaded surface for fixing the two tap assemblies (15) of the dispenser (1). Inside each tap connection protrusion (57) there is a through hole (58) to house the tube (16) that connects the manifold with the tap assemblies (15).

The manifold (13) has the purpose of distributing the beer to the two tap assemblies (15) and is housed and positioned in the central portion of the tap connection part (11), in the housing (12) and is removable, which makes it easy to clean.

Figure 13:
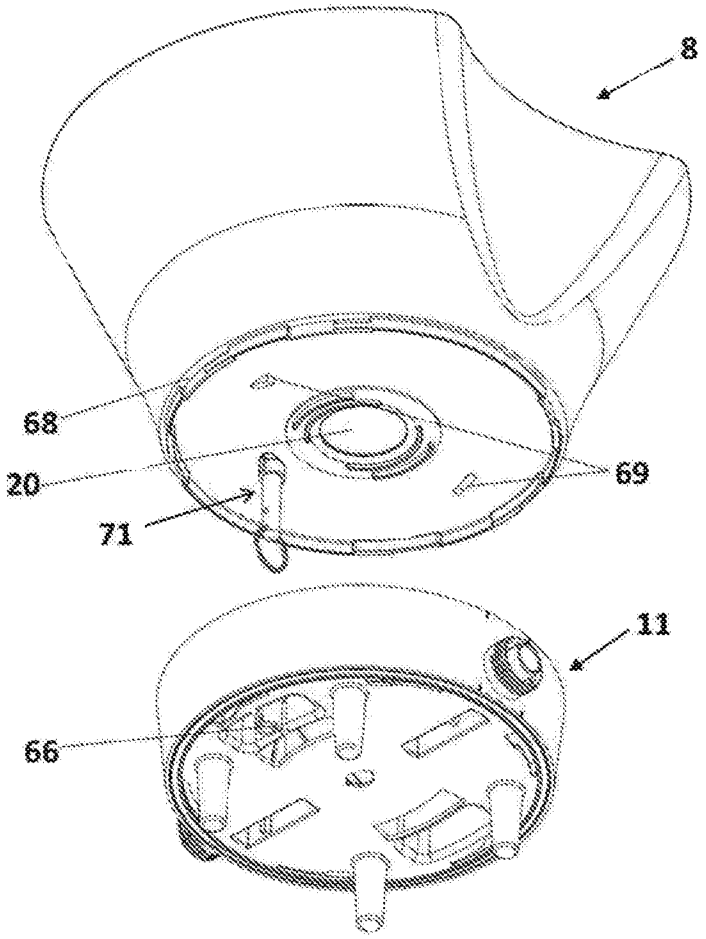
FIG. 13 shows a perspective view of the tap connection part and the cool box.

FIG. 13 shows the cool box (8) in perspective, according to the present invention, wherein in the lower portion thereof it has the central cavity (10) through which the outlet mouth (5) of the cup (4) passes.

Figure 11:
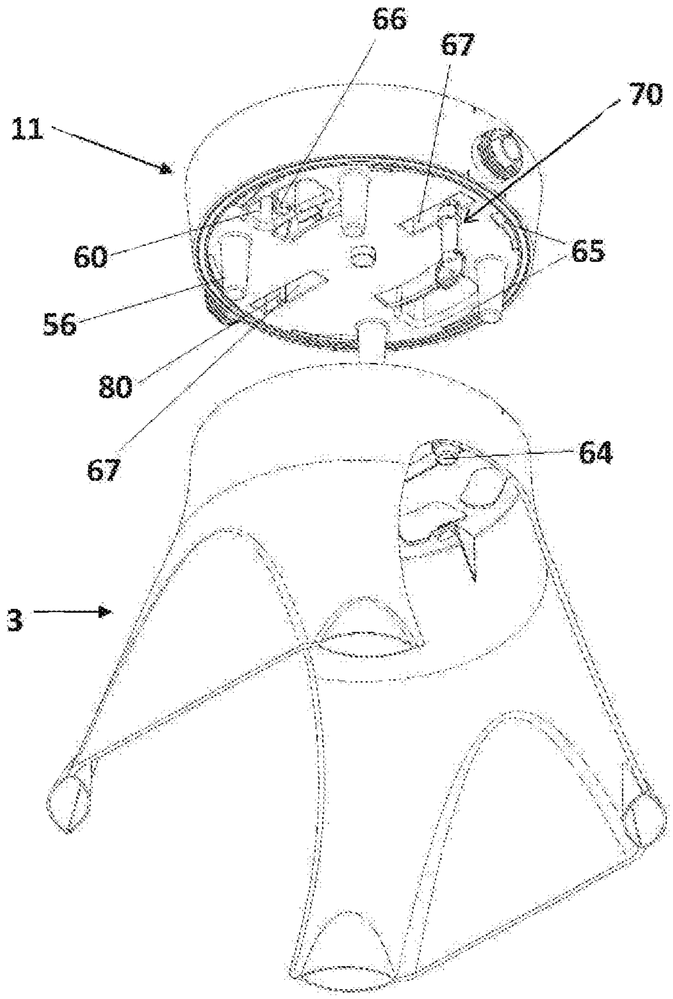
FIG. 11 shows a bottom perspective view of the base and the tap connection part.
Figure 12:
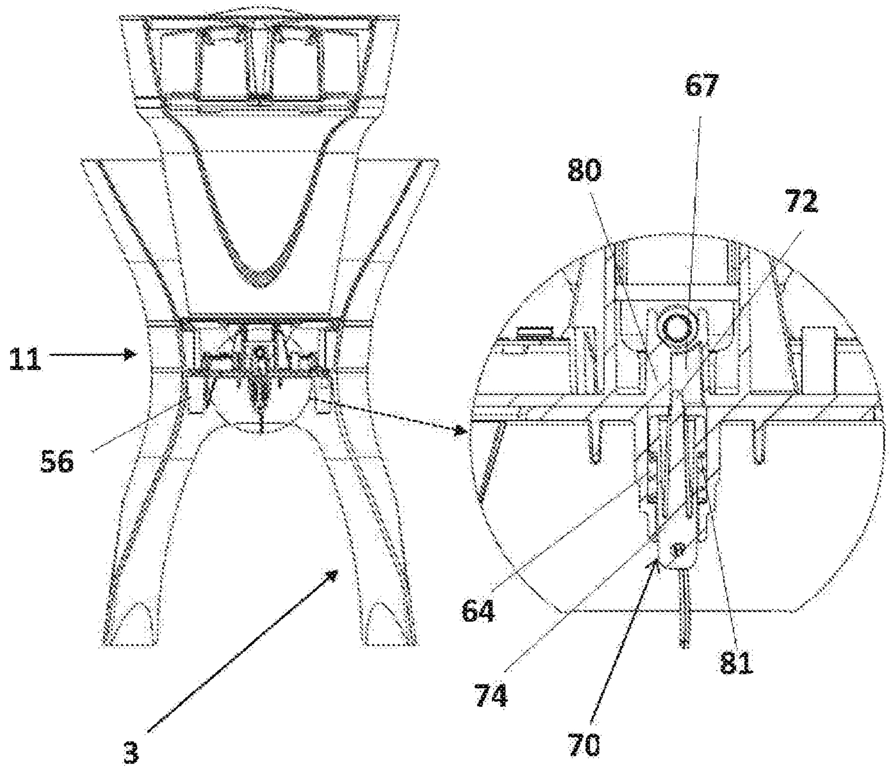
FIG. 12 shows a cross-sectional view of the base and the tap connection part attached together.

With the help of FIGS. 10, 11 and 12, respectively showing a first perspective view, a second perspective view and a cross-sectional view of the attachment between the base (3) and the tap connection part (11), the elements that enable the attachment between said parts can be observed.

FIG. 10 shows that the base (3) comprises attachment ribs (63) on the upper face thereof distributed around the perimeter, as well as having guide bushings (64) on said face that extend along the bottom and are represented in FIG. 11 or in FIG. 12.

The tap connection part (11) additionally incorporates on the lower face thereof first perimeter anchoring rails (65), which can be coupled to the attachment ribs (63) of the base (3); for this the anchoring rails (65) must be facing the attachment ribs (63) and the tap connection part (11) is rotated on the base (3), thus leaving both parts coupled.

Moreover, the tap connection part (11) also incorporates stop housings (67) located on the lower face thereof, wherein at least one of them is located such that it coincides with the position of the guide bushing (64) once the coupling between the tap connection part (11) and the base (3) has been made.

Additionally, the dispenser (1) incorporates a first interlocking element (70) intended for fixing the tap connection part (11) with the base (3), which is inserted through the guide bushing (64) of the base and penetrates in the stop housing (67), wherein there is a ledge (80) against which it makes contact, thus preventing the rotation of the tap connection part (11), which remains thus locked and fixed to the base (3), a situation represented in FIG. 12.

Said first interlocking element (70) is embedded inside the guide bushing (64) and comprises a first piston (74) ending in a first end (72), and a first spring (81), located inside the guide bushing (64) and arranged around the first piston (74). The first end (72) of the first piston (74) makes lateral contact with the aforementioned ledge (80) in that locking position.

To unlock the tap connection part (11) with respect to the base (3), the lower portion of the first piston (74) of the fixing element (70) can be pulled, moving it vertically and in a controlled manner by the action of the first spring (81) and extracting the end (72) thereof from the stop housing (67).

Figure 14:
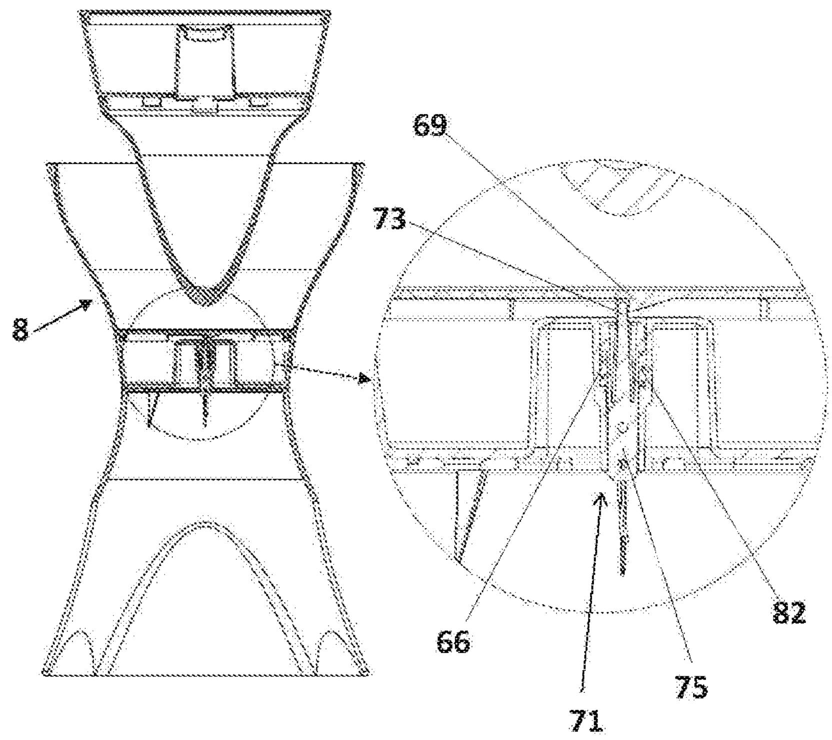
FIG. 14 shows a cross-sectional view of the tap connection part and the cool box, attached together.

On the other hand, FIGS. 13 and 14 respectively show a perspective view of the tap connection part (11) and the cool box (8) and a sectional view of the attachment between said elements.

FIG. 12 shows that the tap connection part (11) has attachment projections (59) along the top and around the perimeter and that the cool box (8) has second anchoring rails (68) on the lower side thereof that can be coupled to the attachment projections (59) by rotating the cool box (8) until the coupling of the cool box (8) with the tap connection part (8) is achieved.

Likewise, it has been provided, as can be seen in FIG. 10 or 14, that the tap connection part (11) incorporates hollow turrets (60) that start at the top, which internally incorporate guide housings (66), preferably, at least one of said turrets (60); and that the cool box (8) has stop elements (69) on the lower face thereof.

To lock the cool box (8) with respect to the tap connection part (11), the dispenser (1) incorporates a second interlocking element (71), housed in the guide housing (66) comprising a second piston (75) finished in a second end (73), such that it is vertically movable until it makes lateral contact with one of the stop elements (69), thus preventing the rotation of the cool box (8) which is thus locked and fixed to the tap connection part (11); and a second spring (82) located inside the guide housing (66) and arranged around the second piston (75), controlling the vertical movement thereof and fixing the position of the second piston (75) in the guide housing (66), situation represented in FIG. 14.

To unlock the cool box (8) with respect to the tap connection part (11), the second end (73) is moved along the bottom, releasing the contact with one of the stop elements (69), thus enabling the cool box (8) to rotate and decouple with respect to the tap connection part (11).

The invention claimed is:

1. A portable desktop refrigerated dispenser for beverages wherein the dispenser comprises:

- a cup configured for housing a beverage, comprising an outlet mouth through which the beverage is ejected,
- a holder lid configured to be linked to the cup at a height with respect to the outlet mouth and that comprises holder lid holes,
- a bottle holder, configured for holding a plurality of bottles, wherein each of the bottles has a neck, configured to couple to the holder lid holes which in turn comprise bottle holder cavities configured for embracing the neck of the bottle and retain the bottle inverted,
- a cool box, having a lower face, which is an outer casing configured to be linked to the cup and which surrounds the cup at a certain distance, delimiting a cooling cavity around the cup which is configured for housing a cooling element,
- a tap connection part, having an upper face and a lower face and comprising a housing,
- at least one tap assembly removably linked to the tap connection part, wherein the at least one tap assembly comprises a tube comprising in turn an inner end and an outer end through which the beverage is dispensed,
- a separate base, having an upper face, configured for resting on a support surface,
- a manifold housed in the housing and connected to the outlet mouth of the cup, which is configured for receiving the beverage and which comprises at least one outlet hole through which the beverage is ejected, wherein the at least one outlet hole is connected to the inner end of the tube of the at least one tap assembly, and wherein

- the bottle holder cavities are configured to retain the neck of the bottle inclined,
- the cool box is linked to the cup by a watertight attachment,
- the cool box comprises a central cavity coaxial to the outlet mouth of the cup, and
- the tap connection part is attached to an upper area of the base.

2. The dispenser of claim 1, wherein the at least one tap assembly comprises a tubular body that partially houses the tube and that comprises an access hole that partially houses a plunger and a handle linked to the plunger; in a vertical rest position the plunger presses the tube deforming the tube and preventing the beverage from coming out and in an activation position the movement of the handle moves the plunger away from the tube, enabling the beverage to pass therethrough.

3. The dispenser of claim 2, wherein the at least one tap assembly comprises a nozzle connected to the body by pressure.

4. The dispenser of claim 2, wherein the at least one tap assembly comprises a spring that embraces the plunger and forces the handle to return to the vertical rest position when the handle is in an intermediate activation position between a fixed horizontal activation position and the vertical rest position.

5. The dispenser of claim 4, wherein the manifold comprises two external connections that are tubular protrusions that respectively define the at least one outlet hole and the dispenser comprises two tap assemblies, wherein the tubes of the two tap assemblies embrace the external connections at the inner end thereof.

6. The dispenser of claim 5, wherein the outlet mouth of the cup is a tubular protrusion with a threaded outer surface and the manifold comprises a non-through cavity wherein the outlet mouth is connected.

7. The dispenser of claim 6, wherein the at least one tap assembly additionally comprises a stop extension starting from the handle in a front area and limits a range of movement of said handle from the vertical rest position to the fixed horizontal activation position.

8. The dispenser of claim 1, comprising a sealing gasket between the cup and the cool box around the central cavity intended for preventing leaks of the cooling element housed in the cooling cavity.

9. The dispenser of claim 1, wherein the bottle holder comprises conical tubular bodies limited by an upper bottle holder edge and a lower bottle holder edge, wherein the upper bottle holder edge is inclined with respect to the lower bottle holder edge.

10. The dispenser of claim 9, wherein the bottle holder comprises a curved surface that extends from the upper bottle holder edge towards the cavity of the bottle holder.

11. The dispenser of claim 1, wherein the holder lid holes describe a narrowing area and the bottle holders comprise an attachment tab that is clipped to the narrowing area.

12. The dispenser of claim 1, wherein the holder lid comprises a circular base surface comprising the holder lid holes and which is limited by a lower holder lid edge configured to be linked to the cup from which a lateral surface extends.

13. The dispenser of claim 12, wherein the cup comprises an upper cup edge comprising in turn first attachment elements and the holder lid comprises second attachment elements on the lower holder lid edge configured to be linked to the first attachment elements.

14. The dispenser of claim 1, comprising an upper lid covering the holder lid.

15. The dispenser of claim 1, comprising a closure gasket between the manifold and the cup which prevents leaks.

16. The dispenser of claim 1, wherein the tap connection part comprises support legs.

17. The dispenser of claim 1, wherein the base comprises attachment ribs on the upper face thereof distributed around the perimeter and the tap connection part incorporates on the lower face thereof first perimeter anchoring rails, configured to be coupled to the attachment ribs of the base.

18. The dispenser of claim 17, wherein the base additionally comprises guide bushings on the upper face thereof, the tap connection part incorporates stop housings on the lower face thereof wherein there is a ledge, and the dispenser additionally incorporates a first interlocking element comprising a first piston ending in a first end intended for fixing the tap connection part with the base, which is inserted through one of the guide bushings of the base and penetrates in the stop housing, making lateral contact with the ledge preventing the rotation of the tap connection part which remains locked and fixed to the base.

19. The dispenser of claim 18, wherein the first interlocking element additionally comprises a first spring arranged around the first piston and internally in one of the guide bushings, embedding said first piston in one of the guide bushings and controlling a vertical movement thereof.

20. The dispenser of claim 1 wherein the tap connection part comprises perimeter attachment projections on the upper face thereof, the cool box has second anchoring rails on the lower face thereof that can be coupled to the attachment projections.

21. The dispenser of claim 20, wherein the tap connection part incorporates hollow turrets, which internally incorporate guide housings, the cool box has stop elements on the lower face thereof, and the dispenser additionally incorporates a second interlocking element, housed in one of the guide housings, which comprises a second piston ending in a second end, vertically movable until the second piston makes lateral contact with one of the stop elements, thus preventing the rotation of the cool box which is locked and fixed to the tap connection part.

22. The dispenser of claim 21, wherein the second interlocking element additionally comprises a second spring arranged around the second piston and internally in the guide housing, embedding said second piston in the guide housing and controlling the vertical movement thereof.

23. The dispenser of claim 1, wherein the beverage is beer and the beverage bottles are beer bottles.

* * * * *